United States Patent [19]

Tateyama

[11] Patent Number: 4,978,171
[45] Date of Patent: Dec. 18, 1990

[54] ARM REST DEVICE FOR USE WITH VEHICULAR SEAT

[75] Inventor: Tomoyoshi Tateyama, Ayase, Japan
[73] Assignee: Ikeda Bussan Co., Ltd., Ayase, Japan
[21] Appl. No.: 434,282
[22] Filed: Nov. 13, 1989

[30] Foreign Application Priority Data

Feb. 27, 1989 [JP] Japan .............................. 1-21577[U]

[51] Int. Cl.$^5$ ................................................ A47C 7/54
[52] U.S. Cl. ...................................... 297/417; 297/366
[58] Field of Search ................ 297/417, 356, 366, 411

[56] References Cited

U.S. PATENT DOCUMENTS

| | | | |
|---|---|---|---|
| 773,720 | 11/1904 | Drury | 297/356 X |
| 2,217,352 | 10/1940 | Todd et al. | 197/356 X |
| 4,230,414 | 10/1980 | Cheshire | 297/417 X |
| 4,354,710 | 10/1982 | Rauschenberger | 297/356 |
| 4,621,864 | 11/1986 | Hill | 297/356 X |
| 4,685,501 | 4/1987 | Ishigami et al. | 297/417 X |

FOREIGN PATENT DOCUMENTS 0063969  11/1982  European Pat. Off. ............ 297/417

*Primary Examiner*—Jose V. Chen
*Attorney, Agent, or Firm*—Foley & Lardner, Schwartz, Jeffery, Schwaab, Mack, Blumenthal & Evans

[57] ABSTRACT

Disclosed herein is an arm rest device for a vehicle seat. The device comprises a shaft secured to a seatback of the seat; an arm rest proper pivotally connected to the shaft thereby to pivot between first and second angular positions; a generally circular plate concentrically secured to the shaft, the circular plate including a larger diameter sectoral portion and a toothed portion; a blocking plate pivotally disposed about the shaft, the blocking plate including a larger diameter sectoral portion and a radial extension, the radial extension having a flange and a notch; a latch member pivotally connected at its generally middle portion to the arm rest proper, the latch member having at its one end a pawl which is latchingly engageable with the toothed portion of the circular plate and at the other end a pointed portion which is engageable with the flange and notch of the blocking plate; first stopper structure for stopping the arm rest proper at the first and second angular positions; second stopper structure for stopping rotation of the blocking plate relative to the shaft when the blocking plate rotates by a given degree in a given direction to disengage the flange from the pointed portion; and biasing structure for biasing the latch member in a direction to achieve the latching engagement between the pawl and the toothed portion and biasing the blocking plate in the given direction.

9 Claims, 3 Drawing Sheets

ARM REST DEVICE FOR USE WITH VEHICULAR SEAT

BACKGROUND OF THE INVENTION

1. Field of the Invention

The present invention relates in general to arm rest devices for use with vehicular seats, and more particularly, to arm rest devices of a type in which an arm rest proper is pivotally connected to a seatback so as to assume an "in-use" position wherein the arm rest 0 proper projects forward from the seatback, and a "not in-use" position wherein the arm rest proper extends upward along one side of the seatback.

2. Description of the Prior Art

Japanese Utility Model Second Provisional Publication No. 63-45968 shows a conventional arm rest device of the type as mentioned hereinabove.

The device is equipped with a control rod which is manipulated by a seat occupant. That is, when the control rod is pushed by a seat occupant, a rear end of the control rod pushes a ratchet arm against a biasing force applied thereto, thereby to disengage the ratchet arm from a ratchet. With this, the arm rest is permitted to pivot freely upward or downward. When the arm rest is pivoted by the seat occupant to a desired angular position, he or she stops pushing the control rod. Upon this, a due to biasing force, the ratchet arm is pivoted into engagement with the ratchet thereby to restrain the arm rest proper at the desired angular position.

However, the arm rest device of the publication is complicated in construction and thus is relatively expensive to produce. Furthermore, manipulation of the device is difficult or at least troublesome. In fact, the angular position adjustment of the arm rest proper must be made by pushing or pulling the arm rest with the control rod kept pushed by the seat occupant.

SUMMARY OF THE INVENTION

It is therefore an object of the present invention to provide a position adjustable arm rest device which is free of the above-mentioned drawbacks.

According to the present invention, there is provided an arm rest device which comprises a shaft secured to a fixed member; an arm rest proper having one end portion pivotally disposed about the shaft, the arm rest proper being pivotal between first and second angular positions; a generally circular plate concentrically secured to the shaft, the circular plate including a larger diameter sectoral portion and a toothed portion; a blocking plate pivotally disposed about the shaft, the blocking plate including a larger diameter sectoral portion and a radial extension, the radial extension having a flange and a notch; a latch member pivotally connected at its generally middle portion to the arm rest proper, the latch member having at its one end a pawl which is latchingly engageable with the toothed portion of the circular plate, and having at the other end a pointed portion which is engageable with the flange and notch of the blocking plate; first stopper means for stopping the arm rest proper at the first and second angular positions; second stopper means for stopping rotation of the blocking plate relative to the shaft when the blocking plate rotates by a given degree in a given direction to disengage the flange from the pointed portion; and biasing means for biasing the latch member in a direction to achieve the latching engagement between the pawl and the toothed portion and biasing the blocking plate in the given direction.

BRIEF DESCRIPTION OF THE DRAWINGS

Other objects and advantages of the present invention will become apparent from the following description when taken in conjunction with the accompanying drawings in which.

DETAILED DESCRIPTION OF THE INVENTION

Figure 1:
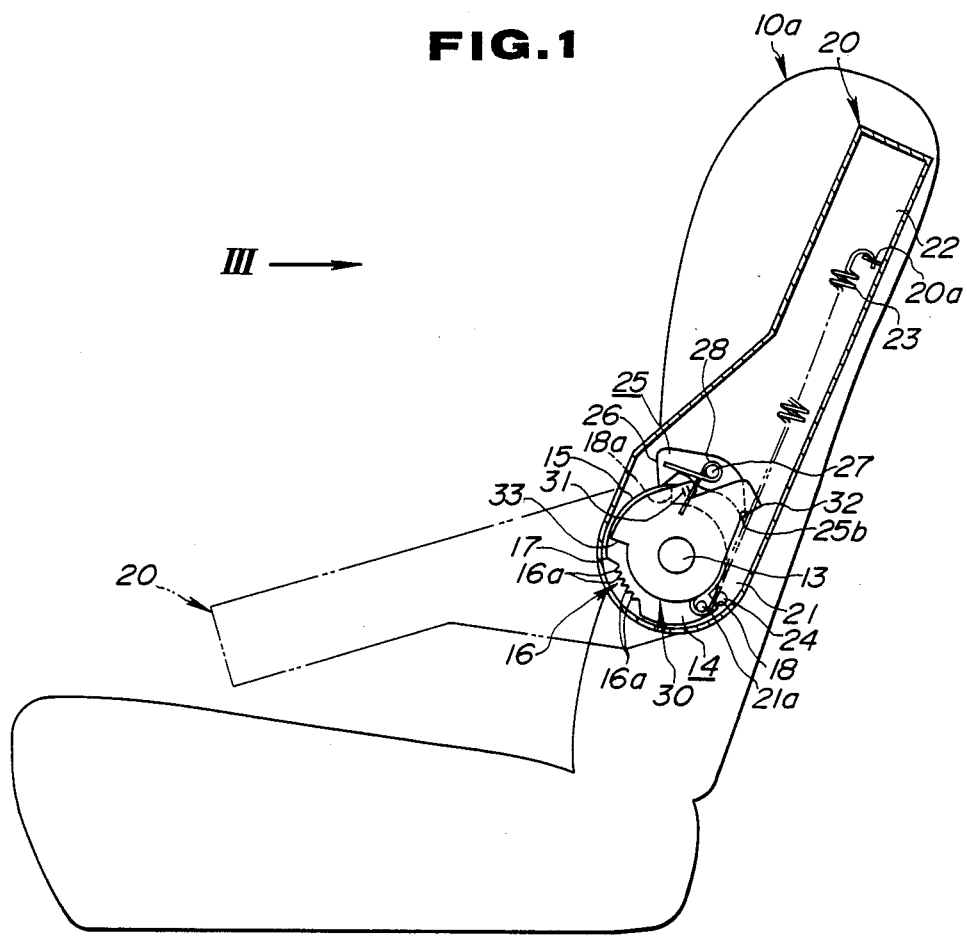
FIG. 1 is a side view of an arm rest device of the present invention, with a vehicular seat to which the arm rest device is mounted.
Figure 2:
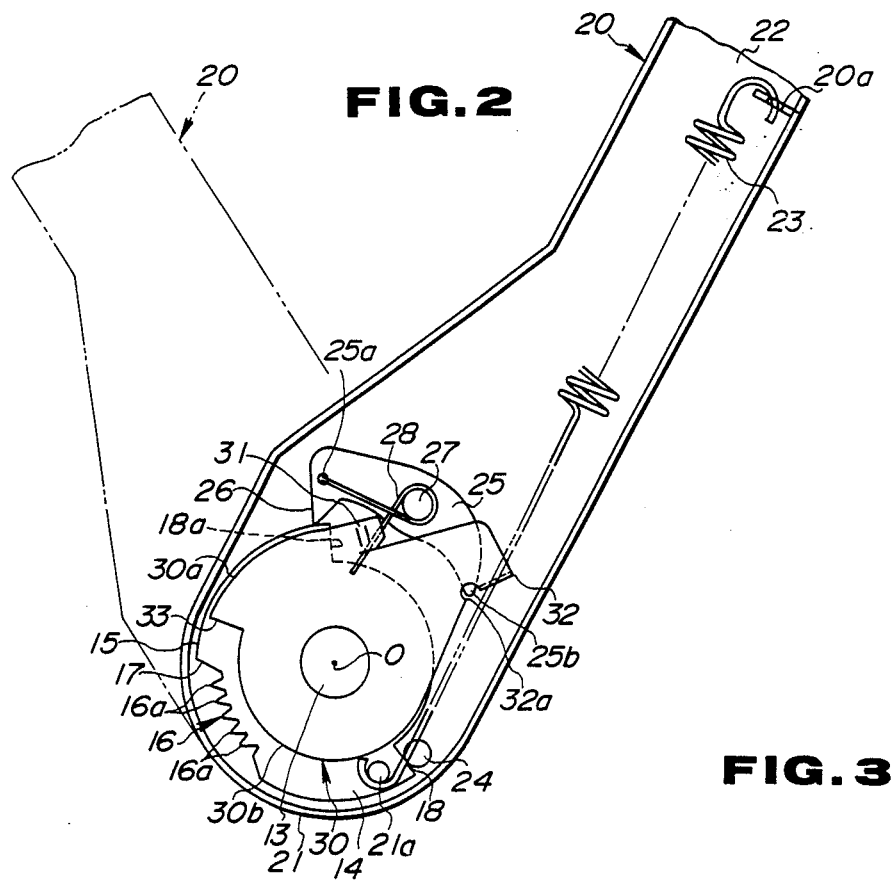
FIG. 2 is an enlarged side view of an essential part of the arm rest device with a cover part removed.
Figure 3:
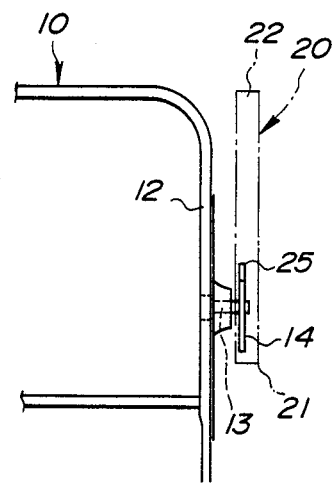
FIG. 3 is a partial front view of the arm rest device, which is taken from the direction of the arrow "III" of FIG. 1.

Referring to the accompanying drawings, particularly FIGS. 1, 2 and 3, there is shown an arm rest device according to the present invention, which is mounted on one side of a seatback 10a of a vehicular seat.

As is seen from FIG. 3, the seatback 10a to which the arm rest device is mounted comprises a substantially rectangular frame 10 which has opposed side frame portions 12 (only one is shown).

A shaft 13 is secured to one of the side frame portions 12 and projects outwardly. An arm rest proper 20 has one (or lower) end portion 21 pivotally 0 connected to the shaft 13. As will be clarified hereinafter, the arm rest proper 20 is pivotal between an "in-use" position wherein, as illustrated by a phantom line in FIG. 1, the arm rest proper 20 projects forward from the seatback 10a, and a "not in-use" position wherein the arm rest proper 20 extends upward along the side of the seatback 10a. The arm rest proper 20 has at the lower end portion 21 a stopper pin 24 secured thereto, and at a relatively upper portion a spring holder 20a secured thereto.

As is best shown in FIG. 2, a generally circular plate 14 is secured at its central portion to the shaft 13. The circular plate 14 has a larger diameter sectoral portion 15 and a toothed portion 16 which is o positioned beside the sectoral portion 15. The toothed portion 16 includes a plurality of teeth 16a. These teeth 16a are arranged to extend concentric with the shaft 13. As shown in the drawing, the leftmost tooth 16a is connected to the sectoral portion 15 through a gentle slope 17. The circular plate 14 has, at a portion diametrically opposite to the toothed portion 16, an arcuate recess which is shaped concentric with the shaft 13 and defined between two, viz., right and left stopper edges 18 and 18a as shown. The arcuate recess receives the stopper pin 24 of the arm rest proper 20.

Thus, it will be appreciated that during the pivotal movement of the arm rest proper 20 about the shaft 13, the stopper pin 24 moves in and along the arcuate recess. That is, when the stopper pin 24 is brought into abutment with the right stopper edge 18 as shown in FIG. 2, the arm rest proper 20 assumes the "not in-use" position, while, when the stopper pin 24 is brought into abutment with the left stopper edge 18a, the arm rest proper 20 assumes the "in-use" position.

The fixed circular plate 14 has, near the right stopper edge 18, a pin 21a fixed thereto.

A return spring 23 stretches between the pin 21a of the plate 14 and the afore-mentioned spring holder 20a of the arm rest proper 20. Thus, it will be appreciated that the arm rest proper 20 is compelled to pivot in a snap action manner about the shaft 13 in either the clockwise or the counterclockwise direction from a neutral position wherein the spring 23 extends through the center "O" of the shaft 13.

A latch member 25 is pivotally connected through a pivot pin 27 to the arm rest proper 20 at such a o position that a pawl 26 of the latch member 25 is latchingly engageable with the teeth 16a of the fixed circular plate 14 when the arm rest proper 20 assumes the "in-use" position. That is, as will become apparent hereinafter, when the arm rest proper 20 is pivoted in a counter-clockwise direction by a certain angle, the pawl 26 of the latch member 25 is brought into engagement with the rightmost tooth 16a of the fixed circular plate 14. The latch member 25 has at its right part a pointed portion 25b. o A coil spring 28 is disposed about the pivot pin 27 having one end hooked to an opening 25a formed in the latch member 25 and the other end hooked to a blocking plate 30 which will be described in the following.

The blocking plate 30 is pivotally connected to the shaft 13 lapping over the fixed circular plate 14. The blocking plate 30 has a larger diameter sectoral portion 30a and a raised portion 31 which has the other end of the coil spring 28 hooked thereto. For the reason which will become apparent hereinafter, the radius of the sectoral portion 30a of is somewhat smaller than that of the sectoral portion 15 of the circular plate 14 but larger than that of an imaginary circle which includes tops of the teeth 16a of the circular plate 14.

With provision of the coil spring 28, the latch member 25 is biased to rotate about the pivot pin 27 in a counterclockwise direction in FIG. 2, and the blocking plate 30 is biased to rotate about the shaft 13 in a counterclockwise direction in the same drawing.

The blocking plate 30 has further a radial extension which is formed with an engaging flange 32. The engaging flange 32 is formed at its inside portion with a notch 32a. As shown in FIG. 2, the engaging flange 32 is engageable with the pointed portion 25b of the latch member 25, as will become apparent hereinafter.

The blocking plate 30 further has a stopper edge 33 which constitutes one side of the sectoral portion 30a and is brought into abutment with the pin 21a of the fixed circular plate 14 upon a certain condition.

In the following, operation of the arm rest device of the invention will be described with reference to the drawings.

Figure 5:
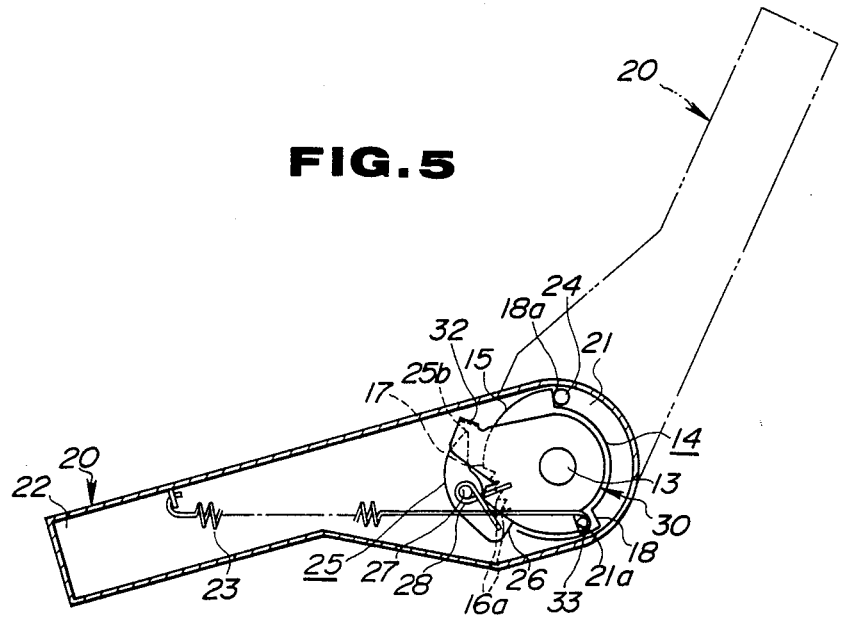

For ease of understanding, the description will be commenced with respect to the lowermost in-use position of the arm rest proper 20, as shown in FIG. 5.

Under this condition, the pawl 26 of the latch member 25 is engaged with the rightmost tooth 16a of the fixed circular plate 14, and the pointed portion 25b of the latch member 25 is disengaged from the engaging flange 32 of the blocking plate 30. Furthermore, under this condition, the stopper pin 24 of the arm rest proper 20 is in abutment with the stopper edge 18a of the fixed circular plate 14. Thus, the arm rest proper 20 is suppressed from pivoting counterclockwise further about the shaft 13. However, for the reasons which will be described in the following, the arm rest proper 20 is permitted to effect a clockwise pivoting from the lowermost in-use position.

That is, when an external force is applied to the arm rest proper 20 to pivot the same in a clockwise direction in FIG. 5 against the biasing force of the return spring 23, the pawl 26 of the latch member 25 gets over the rightmost tooth 16a and comes into engagement with a neighbouring tooth 16a, pivoting the latch member 25 against the force of the coil spring 28. Upon this, the pointed portion 25b of the latch member 25 is brought into abutment with the flange 33 of the blocking plate 30.

It is to be noted that a new angular position of the arm rest proper 20 is now established. Due to engagement of the pawl 26 with the neighbouring tooth 16a, a counterclockwise pivoting of the arm rest proper 20 (that is, the pivoting toward the lowermost position) from the new angular position is suppressed.

When then the arm rest proper 20 is forced upward, the same is pivoted upward permitting the pawl 26 of the latch member 25 to get over the tooth 16a and engage with a subsequent tooth 16a. During this, the pointed portion 25b of the latch member 25 pushes the flange 33, thereby pivoting the blocking plate 30 about the shaft 13 in a clockwise direction. Another new angular position of the arm rest proper 20 is now established.

When the arm rest proper 20 is further forced upward, the same is further pivoted upward, permitting the pawl 25 of the latch member 26 to successively engage the remaining teeth 16a one after another and turning the blocking plate 30 about the shaft 13 in the same direction.

It is thus to be noted that the teeth 16a of the fixed circular plate 14 help cause the arm rest proper 20 to assume various angular positions. Due to the same reason as has been described hereinabove, the arm rest proper 20 assuming each position is suppressed from pivoting downward When the arm rest proper 20 is further pivoted upward, the pawl 26 of the latch member 25 rides over the gentle slope 17 of the toothed portion 16 and rides on the sectoral portion 15 of the fixed circular plate 14. Upon this, the pointed portion 25b of the latch member 25 is brought into engagement with the notch 32a of the flange 32 due to the biasing force of the coil spring 28. Thus, thereafter, the latch member 25 and the blocking plate 30 move like a single unit.

As will be understood from FIG. 2, under this engaged condition, the pawl 26 of the latch member 25 and the larger diameter sectoral portion 30a of the blocking plate 30 move simultaneously in the same direction as the pawl 26 slides rearward on the sectoral portion 15 of the fixed circular plate 14.

When the arm rest proper 20 passes over the neutral position wherein the return spring 23 extends through the center "O" of the shaft 13, the clockwise pivoting of the arm rest proper 20 about the shaft 13 is assisted by the spring 23 for the reason which has been mentioned hereinafore. Thus, thereafter, the arm rest proper 20 is automatically pivoted clockwisely toward and finally to the "not in-use" position illustrated in FIGS. 1 and 2 in which the stopper pin 24 of 0 the arm rest proper 20 abuts against the right stopper edge 18 of the fixed circular plate 14. Because, under this "not in-use"0 condition, the stopper pin 24 is constantly pressed againt the stopper edge 18 by the force of the return spring 23, the arm rest proper 20 is held stationarily without play even when the associated motor vehicle vibrates during cruising.

When the arm rest proper 20 is then pushed forward, the arm rest proper 20 is permitted to pivot forward, that is, in a counterclockwise direction against the force of the return spring 23. When the arm rest proper 20 passes over the neutral position, the counterclockwise pivoting of the arm rest proper 20 is assisted by the spring 23. Thus, thereafter, the arm rest proper 20 is automatically pivoted counterclockwisely toward the "in-use" position During this, the pawl 26 of the latch member 25 slides forward on the sectoral portion 15 while inducing a simultaneous movement of the blocking plate 30. When the pawl 26 is disengaged from the sectoral portion 15, the pawl 26 transfers to the sectoral portion 30a of the blocking plate 30, and thus thereafter, the pawl 26 and the sectoral portion 30a pivot like a single unit, preventing the pawl 26 from engaging the teeth 16a of the fixed circular plate 14.

Figure 4:
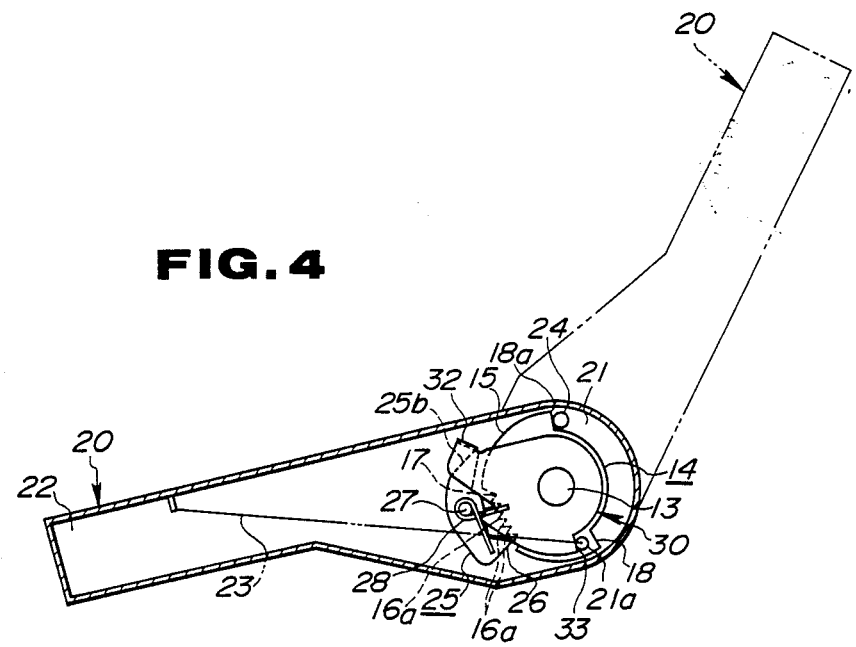
FIGS. 4 and 5 are side view of the arm rest device in different conditions.

When, due to further pivoting of the arm rest proper 20, the pawl 26 and the sectoral portion 30a are brought to certain positions wherein the stopper edge 33 of the blocking plate 30 is in abutment with the pin 21a of the fixed circular plate 14 and the stopper pin 24 of the arm rest proper 20 is in abutment with the left stopper edge 18a of the fixed circular plate 14 as shown in FIG. 4, the pointed portion 25b of the latch member 25 is disengaged from the engaging flange 32 of 0 the blocking plate 30.

Upon this, the latch member 25 is pivoted in a counterclockwise direction due to the force of the coil spring 28, causing the pawl 26 to fall from the sectoral portion 30a into a smaller diameter periphery 30b. With this, the pawl 26 of the latch member 25 is brought into engagement with the rightmost tooth 16a of the fixed circular plate 14. Thus, the arm rest proper 20 assumes the lowermost in-use position as shown in FIG. 5.

Under this lowermost in-use position, the stopper pin 24 is pressed against the left stopper edge 18a of the fixed circular plate 14 due to the force of the return spring 23, and thus the arm rest proper 20 is held stationarily without play, even when the associated motor vehicle vibrates during cruising.

As will be understood from the foregoing description, in the the present invention, the position adjustment of the arm rest proper 20 is easily achieved by only raising the same to a desired position. This is not expected from the conventional arm rest device as mentioned hereinafore.

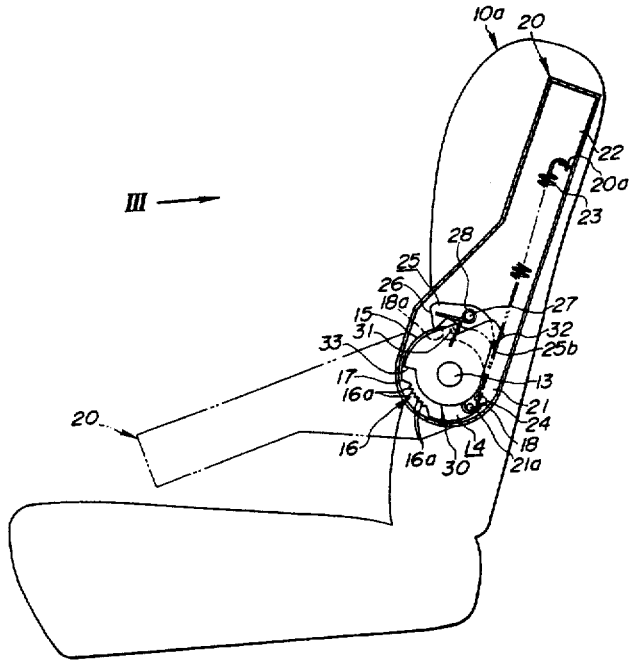

What is claimed is:

1. An arm rest device comprising:
   a shaft secured to a fixed member;
   an arm rest proper having one end portion pivotally disposed about said shaft, said arm rest proper being pivotal between first and second angular positions;
   a generally circular plate concentrically secured to said shaft, said circular plate including a larger diameter sectoral portion and a toothed portion;
   a blocking plate pivotally disposed about said shaft, said blocking plate including a larger diameter sectoral portion and a radial extension, said radial extension having a flange and a notch;
   a latch member pivotally connected at a generally middle portion thereof to said arm rest proper, said latch member having at its one end a pawl which can form a latching engagement with said toothed portion of said circular plate, and having at the other end a pointed portion which is engageable with said flange and said notch of said blocking plate;
   first stopper means, connected to said arm rest proper, for stopping said arm rest proper at said first and second angular positions;
   second stopper means, cooperating with said blocking plate, for stopping rotation of said blocking plate relative to said shaft when said blocking plate rotates by a given degree in a given direction to disengage said flange from said pointed portion; and
   biasing means, connected to said latch member and said blocking plate, for biasing said latch member in a direction to achieve the latching engagement between said pawl and said toothed portion and for biasing said blocking plate in said given direction.

2. An arm rest device as claimed in claim 1, in which the radius of the sectoral portion of said blocking plate is smaller than that of the sectoral portion of said circular plate but larger than that of an imaginary circle which includes tops of teeth of said toothed portion.

3. An arm rest device as claimed in claim 2, further comprising a return spring having one end connected to said circular plate and another end connected to another end portion of said arm rest proper, so that said arm rest proper is biased to pivot about said shaft in one or the other direction from a neutral position wherein said return spring extends through the center of said shaft.

4. An arm rest device as claimed in claim 3, in which said biasing means comprises a coil spring which has one end hooked to said latch member and another end hooked to said blocking plate.

5. An arm rest device as claimed in claim 4, in which said coil spring is disposed at its coiled portion about a pivot pin by which said latch member is pivotally connected to said arm rest proper.

6. An arm rest device as claimed in claim 5, in which said blocking plate has a raised portion to which the other end of said coil spring is hooked.

7. An arm rest device as claimed in claim 6, in which said first stopper means comprises:
   a stopper pin secured to said arm rest proper; and
   means defining an arcuate recess in said circular plate, said recess having opposed stopper edges to which said stopper pin is engageable when said arm rest proper pivots about said shaft.

8. An arm rest device as claimed in claim 7, in which said second stopper means comprises:
   a pin secured to said circular plate; and
   a stopper edge constituting part of said larger diameter sectoral portion of said blocking plate, said stopper edge being brought into abutment with said pin when said blocking plate rotates in said given direction.

9. An arm rest device as claimed in claim 8, in which one end of said return spring is hooked to said pin of the circular plate.

* * * * *

UNITED STATES PATENT AND TRADEMARK OFFICE
CERTIFICATE OF CORRECTION

PATENT NO. : 4,978,171

DATED : December 18, 1990

INVENTOR(S) : Tomoyshi Tateyama

It is certified that error appears in the above-identified patent and that said Letters Patent is hereby corrected as shown below:

The title page should be deleted to appear as per attached title page.

Signed and Sealed this

Thirteenth Day of April, 1993

Attest:

STEPHEN G. KUNIN

Attesting Officer      Acting Commissioner of Patents and Trademarks

United States Patent [19]

Tateyama

[11] Patent Number: 4,978,171
[45] Date of Patent: Dec. 18, 1990

[54] ARM REST DEVICE FOR USE WITH VEHICULAR SEAT

[75] Inventor: Tomoyoshi Tateyama, Ayase, Japan
[73] Assignee: Ikeda Bussan Co., Ltd., Ayase, Japan
[21] Appl. No.: 434,282
[22] Filed: Nov. 13, 1989
[30] Foreign Application Priority Data Feb. 27, 1989 [JP] Japan ................... 1-21577[U]

[51] Int. Cl.$^5$ .................................................. A47C 7/54
[52] U.S. Cl. ...................................... 297/417; 297/366
[58] Field of Search ................ 297/417, 356, 366, 411

[56] References Cited

U.S. PATENT DOCUMENTS

| 773,720 | 11/1904 | Drury | 297/356 X |
|---|---|---|---|
| 2,217,352 | 10/1940 | Todd et al. | 197/356 X |
| 4,230,414 | 10/1980 | Cheshire | 297/417 X |
| 4,354,710 | 10/1982 | Rauschenberger | 297/356 |
| 4,621,864 | 11/1986 | Hill | 297/356 X |
| 4,685,501 | 4/1987 | Ishigami et al. | 297/417 X |

FOREIGN PATENT DOCUMENTS 0063969 11/1982 European Pat. Off. ............ 297/417

*Primary Examiner*—Jose V. Chen
*Attorney, Agent, or Firm*—Foley & Lardner, Schwartz, Jeffery, Schwaab, Mack, Blumenthal & Evans

[57] ABSTRACT

Disclosed herein is an arm rest device for a vehicle seat. The device comprises a shaft secured to a seatback of the seat; an arm rest proper pivotally connected to the shaft thereby to pivot between first and second angular positions; a generally circular plate concentrically secured to the shaft, the circular plate including a larger diameter sectoral portion and a toothed portion; a blocking plate pivotally disposed about the shaft, the blocking plate including a larger diameter sectoral portion and a radial extension, the radial extension having a flange and a notch; a latch member pivotally connected at its generally middle portion to the arm rest proper, the latch member having at its one end a pawl which is latchingly engageable with the toothed portion of the circular plate and at the other end a pointed portion which is engageable with the flange and notch of the blocking plate; first stopper structure for stopping the arm rest proper at the first and second angular positions; second stopper structure for stopping rotation of the blocking plate relative to the shaft when the blocking plate rotates by a given degree in a given direction to disengage the flange from the pointed portion; and biasing structure for biasing the latch member in a direction to achieve the latching engagement between the pawl and the toothed portion and biasing the blocking plate in the given direction.

9 Claims, 3 Drawing Sheets